(12) United States Patent
Chikamori et al.

(10) Patent No.: US 11,938,961 B2
(45) Date of Patent: Mar. 26, 2024

(54) VEHICLE SYSTEM

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 17/571,028

(22) Filed: Jan. 7, 2022

(65) Prior Publication Data

US 2022/0219723 A1    Jul. 14, 2022

(30) Foreign Application Priority Data

Jan. 12, 2021 (JP) ................................. 2021-002886

(51) Int. Cl.
*B60W 60/00* (2020.01)
*B60W 30/10* (2006.01)
*G01C 21/00* (2006.01)

(52) U.S. Cl.
CPC .......... *B60W 60/001* (2020.02); *B60W 30/10* (2013.01); *G01C 21/3841* (2020.08); *G01C 21/387* (2020.08); *G01C 21/3893* (2020.08)

(58) Field of Classification Search
CPC . B60W 60/001; B60W 30/10; G01C 21/3841; G01C 21/387; G01C 21/3893; G01C 21/32; G01C 21/3492
USPC .......................................................... 701/16
See application file for complete search history.

(56) References Cited

U.S. PATENT DOCUMENTS

| 9,672,734 | B1* | 6/2017 | Ratnasingam | H04W 4/44 |
| 2018/0189578 | A1* | 7/2018 | Yang | G06V 10/457 |
| 2019/0154842 | A1* | 5/2019 | Adachi | G01C 21/36 |
| 2019/0315357 | A1* | 10/2019 | Zhang | B60W 30/18163 |
| 2019/0383630 | A1* | 12/2019 | Lee | G01C 21/36 |

(Continued)

FOREIGN PATENT DOCUMENTS

| JP | 2017083446 A | * 5/2017 | ............ B60W 10/04 |
| JP | 2019184499 A | 10/2019 | |

(Continued)

*Primary Examiner* — Hunter B Lonsberry
*Assistant Examiner* — Robert Louis Pinkerton
(74) *Attorney, Agent, or Firm* — Armstrong Teasdale LLP (57) ABSTRACT

A vehicle system includes: a map processing unit that creates local map data based on high accuracy map data and a position of an own vehicle; and an autonomous driving control unit that creates a travel plan for autonomous traveling of the own vehicle based on the local map data and controls traveling of the own vehicle according to the travel plan. The map processing unit creates multiple pieces of transmission data by dividing the local map data so as to correspond to regions on a map and transmits the multiple pieces of transmission data to the autonomous driving control unit. The map processing unit changes a shape and a size of the region on the map corresponding to each piece of transmission data based on selection information which decides a travel mode.

4 Claims, 7 Drawing Sheets

(56) References Cited

U.S. PATENT DOCUMENTS

| | | | |
|---|---|---|---|
| 2020/0089232 A1* | 3/2020 | Gdalyahu | G01C 21/3889 |
| 2020/0096355 A1* | 3/2020 | Mishina | G01C 21/3492 |
| 2020/0110422 A1* | 4/2020 | Takamatsu | B60W 30/18163 |
| 2020/0200547 A1* | 6/2020 | Miller | G01C 21/3815 |
| 2020/0247431 A1* | 8/2020 | Ferencz | G01C 21/3658 |
| 2020/0284591 A1* | 9/2020 | Shapira | G06V 20/584 |
| 2021/0001877 A1* | 1/2021 | Han | G01C 21/3822 |
| 2021/0004363 A1* | 1/2021 | Bailly | G01C 21/3848 |
| 2021/0064057 A1* | 3/2021 | Eldar | B60W 30/18109 |
| 2021/0101616 A1* | 4/2021 | Hayat | G06F 18/21 |
| 2021/0179138 A1* | 6/2021 | Terazawa | B60W 60/001 |
| 2021/0180962 A1* | 6/2021 | Nachstedt | G01C 21/32 |
| 2021/0180981 A1* | 6/2021 | Matsumoto | G01C 21/3815 |
| 2021/0199463 A1* | 7/2021 | Kitahara | B60W 60/001 |
| 2021/0206389 A1* | 7/2021 | Kim | G01C 21/3415 |
| 2021/0381849 A1* | 12/2021 | Aviel | H04N 7/18 |
| 2022/0212678 A1* | 7/2022 | Eisenmann | B60W 40/105 |
| 2022/0281456 A1* | 9/2022 | Giovanardi | G01S 7/4021 |
| 2023/0115708 A1* | 4/2023 | Xiang | B60W 50/14 |
| | | | 701/23 |

FOREIGN PATENT DOCUMENTS

| | | | | |
|---|---|---|---|---|
| JP | 2020038362 A | * | 3/2020 | B60W 60/001 |
| JP | 2021192011 A | * | 12/2021 | |
| WO | WO-2020070532 A1 | * | 4/2020 | G01C 21/3804 |
| WO | WO-2022140657 A1 | * | 6/2022 | B60W 30/18163 |

* cited by examiner

*Fig.7*

VEHICLE SYSTEM

TECHNICAL FIELD

The present invention relates to a vehicle system.

BACKGROUND ART

JP2019-184499A discloses a vehicle system including a map processing unit that creates map information necessary for autonomous driving by processing high accuracy map information and an autonomous driving control unit that performs autonomous driving control based on the map information created by the map processing unit. Since the transmission data transmitted from the map processing unit to the autonomous driving control unit based on the map information has a large data amount, the vehicle system of JP2019-184499A restricts the map regions included in the transmission data to suppress the data amount.

In the autonomous driving of the vehicle, the map processing unit successively creates pieces of transmission data in accordance with the position of the vehicle and transmits the pieces of transmission data to the autonomous driving control unit. The autonomous driving control unit performs autonomous driving control based on the map information, and therefore, before the vehicle reaches a prescribed region, the autonomous driving control unit needs to have received the piece of transmission data corresponding to the region. However, the map information necessary for autonomous driving control changes depending on the travel mode of the vehicle. Therefore, it is preferable to change the transmission data in accordance with the travel mode.

SUMMARY OF THE INVENTION

In view of the foregoing background, a primary object of the present invention is to provide a vehicle system in which the transmission data including the map information is properly transmitted from the map processing unit to the autonomous driving control unit in accordance with the travel mode of the vehicle.

To achieve the above object, one aspect of the present invention provides a vehicle system (1) comprising: a map processing unit (33) that creates local map data based on high accuracy map data and a position of an own vehicle by extracting data of regions near the own vehicle from the high accuracy map data; and an autonomous driving control unit (32) that receives the local map data from the map processing unit, creates a travel plan for autonomous traveling of the own vehicle based on the local map data, and controls traveling of the own vehicle according to the travel plan, wherein the map processing unit creates multiple pieces of transmission data by dividing the local map data so as to correspond to regions on a map and transmits the multiple pieces of transmission data to the autonomous driving control unit, and the map processing unit changes a shape and a size of the region on the map corresponding to each piece of transmission data based on selection information which decides a travel mode.

According to this aspect, it is possible in the vehicle system to transmit the transmission data including the map information properly from the map processing unit to the autonomous driving control unit in accordance with the travel mode of the vehicle. For example, in a case where overtaking is not desired in autonomous driving, it is possible to reduce the data amount of the transmission data by reducing the lane information transmitted to the autonomous driving control unit.

In the above aspect, preferably, the selection information can be set by a user.

According to this aspect, the data amount of the transmission data can be reduced according to the intension of the user.

In the above aspect, preferably, the map processing unit creates the transmission data such that the transmission data is divided for each lane.

According to this aspect, it is possible to divide the transmission data for each lane and reduce the data amount. Also, by reducing the lane information not used in the autonomous driving control, it is possible to reduce the data amount of the transmission data.

In the above aspect, the vehicle system further comprises a map guidance unit that, based on a set destination, sets a route to the destination, wherein the map processing unit decides a recommended lane on which the own vehicle should travel based on the route to the destination, creates the transmission data so as to correspond to the recommended lane based on the selection information and the recommended lane, and transmits the transmission data corresponding to the recommended lane to the autonomous driving control unit.

According to this aspect, since the lane information included in the transmission data is limited to that of the recommended lane, the data amount of the transmission data can be reduced.

In the above aspect, preferably, in the high accuracy map data, a lane is represented by multiple nodes and links connecting the nodes, the links being provided with identification numbers, and the map processing unit stores road additional information corresponding to the identification numbers, divides a link containing specific road additional information from the other links, and creates transmission data by adding the road additional information.

According to this aspect, since the transmission data includes the road additional information, the autonomous driving control unit can use the road additional information to execute the autonomous driving control.

In the above aspect, preferably, the road additional information includes information indicating that the lane is a region in which a reception level of a GNSS signal is lower than a prescribed level.

According to this aspect, the autonomous driving control unit can execute the autonomous driving control while recognizing the regions in which the reception level of the GNSS signal lowers.

According to the foregoing configuration, it is possible in the vehicle system to reduce the data amount of the transmission data transmitted from the map processing unit to the autonomous driving control unit.

DETAILED DESCRIPTION OF THE INVENTION

In the following, a vehicle system according to an embodiment of the present invention will be described with reference to the drawings.

(Vehicle System)

Figure 1:
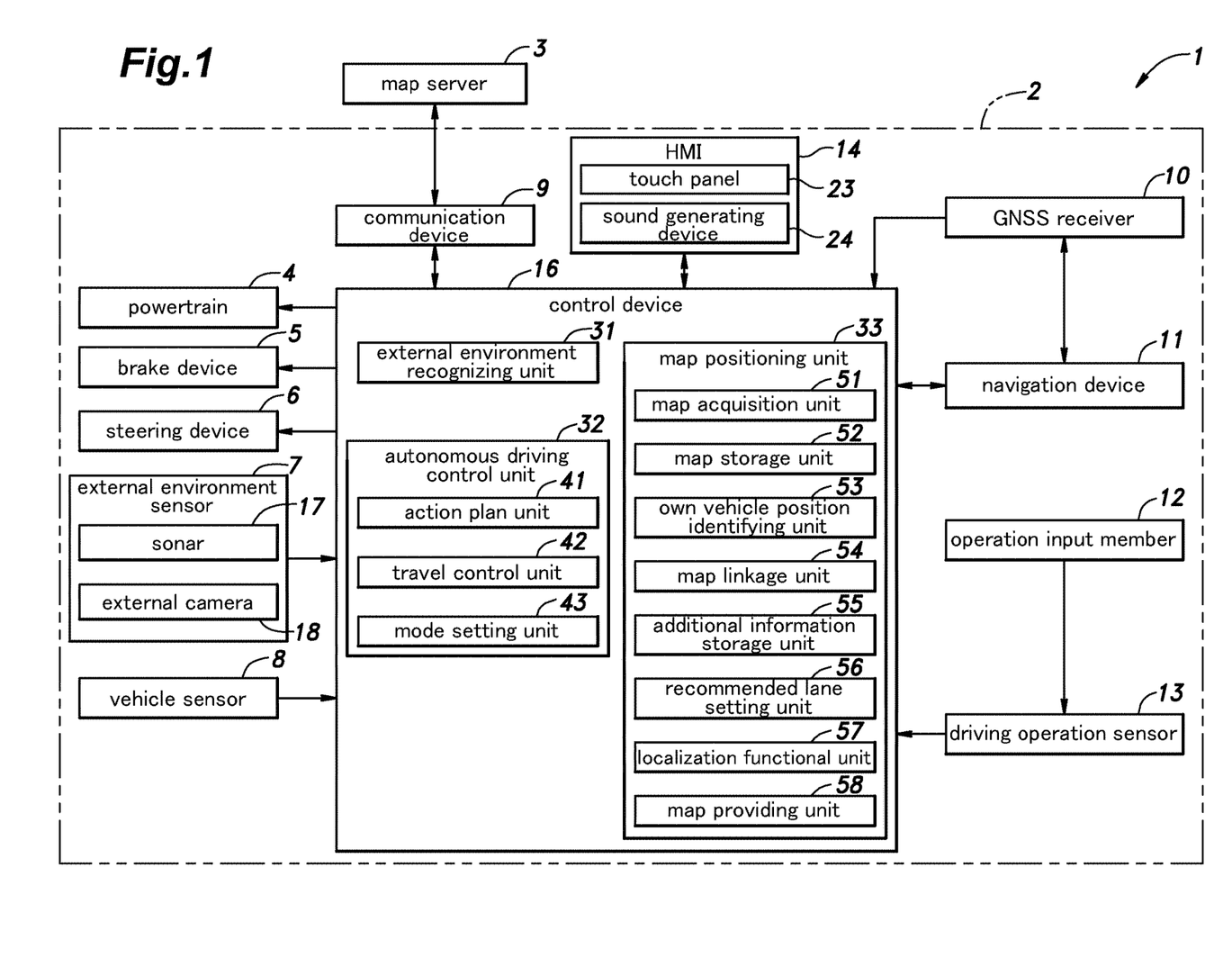
FIG. 1 is a configuration diagram of a vehicle system according to an embodiment of the present invention.

As shown in FIG. 1, a vehicle system 1 is connected with a map server 3 via a network. The vehicle system 1 includes a powertrain 4, a brake device 5, a steering device 6, an external environment sensor 7, a vehicle sensor 8, a communication device 9, a GNSS receiver 10, a navigation device 11 (map guidance unit), an operation input member 12, a driving operation sensor 13, a human machine interface (HMI) 14, and a control device 16. These components of the vehicle system 1 are connected to each other so that signals can be transmitted therebetween via communication means such as a Controller Area Network (CAN).

The powertrain 4 is a device configured to apply a driving force to the vehicle. The powertrain 4 includes at least one of an internal combustion engine, such as a gasoline engine and a diesel engine, and an electric motor. The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include a parking brake device configured to restrict rotations of wheels via a wire cable. The steering device 6 is a device for changing the steering angle of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the control device 16.

The external environment sensor 7 is a sensor that detects electromagnetic waves, sound waves, and the like from the surroundings of the vehicle to detect an object outside the vehicle. The external environment sensor 7 includes sonars 17 and external cameras 18. The external environment sensor 7 may include a millimeter wave radar and/or a laser lidar. The external environment sensor 7 outputs a detection result to the control device 16.

Each sonar 17 consists of a so-called ultrasonic sensor. The sonar 17 emits ultrasonic waves to the surroundings of the vehicle and captures the ultrasonic waves reflected by an object around the vehicle thereby to detect a position (distance and direction) of the object. Multiple sonars 17 are provided at each of a rear part and a front part of the vehicle.

The external cameras 18 are devices configured to capture images around the vehicle. Each external camera 18 consists of a digital camera using a solid imaging element, such as a CCD or a CMOS, for example. Each external camera 18 may be a stereo camera or a monocular camera. The external cameras 18 may include a front camera for capturing an image in front of the vehicle, a rear camera for capturing an image to the rear of the vehicle, and a pair of side cameras for capturing images on left and right side of the vehicle.

The vehicle sensor 8 is a sensor that measures a state of the vehicle. The vehicle sensor 8 includes a vehicle speed sensor configured to detect the speed of the vehicle, an acceleration sensor configured to detect acceleration of the vehicle, a yaw rate sensor configured to detect the angular velocity around a vertical axis of the vehicle, and a direction sensor configured to detect the direction of the vehicle. For example, the yaw rate sensor consists of a gyro sensor. The vehicle sensor 8 may include a tilt sensor configured to detect the tilt of the vehicle body and a wheel speed sensor configured to detect the rotation speed of one or more wheels.

The communication device 9 mediates communication between the control device 16 and devices outside the vehicle (for example, the map server 3). The communication device 9 includes a router for connecting the control device 16 to the Internet. The communication device 9 preferably has a wireless communication function that mediates wireless communication between the control device 16 and a control device 16 of another vehicle around the own vehicle and/or wireless communication between the control device 16 and roadside devices on the road.

The GNSS receiver 10 receives a signal (hereinafter referred to as a "GNSS signal") from multiple satellites constituting a global navigation satellite system (GNSS). The GNSS receiver 10 outputs the received GNSS signal to the navigation device 11 and the control device 16.

The navigation device 11 is configured by a computer made of known hardware. The navigation device 11 identifies the current position (latitude and longitude) of the vehicle based on the latest travel history and/or the GNSS signal output from the GNSS receiver 10. The navigation device 11 is provided with a RAM, a HDD, an SSD or the like for storing data related to the road information in the areas and/or countries in which the vehicle may travel (hereinafter referred to as "navigation map data").

The navigation device 11 sets a route from the current position of the vehicle to the destination input by an occupant of the vehicle based on the GNSS signal and the navigation map data and outputs the route to the control device 16. When the vehicle starts traveling, the navigation device 11 provides the occupant with a route guide to the destination.

The navigation device 11 holds, as the information related to the roads on the map, information regarding points (nodes) on the roads and line segments (links) connecting the nodes. Preferably, the nodes held in the navigation device 11 are provided at feature points such as intersections and merge points, for example. The navigation device 11 stores the distance between the nodes connected by each link in association with the information of each link. The navigation device 11 acquires an appropriate route from the current position of the vehicle to the destination based on the distances between the nodes and outputs information indicating the route to the control device 16. The output information indicating the route includes the points (nodes) on the roads corresponding to the route and the links corresponding to the vectors connecting the nodes.

The operation input member 12 is provided in a vehicle cabin to receive an input operation performed by the occupant to control the vehicle. The operation input member 12 includes a steering wheel, an accelerator pedal, and a brake pedal. The operation input member 12 may further include a shift lever, a parking brake lever, a turn signal lever, or the like.

The driving operation sensor 13 is a sensor that detects an operation amount of the operation input member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 outputs a detected operation amount to the control device 16. The driving operation sensor 13 may include a grasp sensor configured to detect grasping of the steering wheel by the occupant. For example, the grasp sensor is constituted of an electrostatic capacitance sensor provided on an outer circumferential portion of the steering wheel.

The HMI 14 notifies the occupant of various kinds of information by display and/or voice and receives an input operation by the occupant. The HMI 14 includes, for example, a touch panel 23 that includes a liquid crystal display or an organic EL display and is configured to receive the input operation by the occupant and a sound generation device 24 such as a buzzer or a speaker. The HMI 14 is capable of displaying a driving mode switching button on the touch panel 23. The driving mode switching button is a button for receiving an operation of the occupant to switch the driving mode (for example, an autonomous driving mode and a manual driving mode) of the vehicle.

The HMI 14 also functions as an interface that mediates output and input to and from the navigation device 11. Namely, when the HMI 14 receives a destination input operation by the occupant, the navigation device 11 starts setting a route to the destination. Also, when the navigation device 11 performs the route guidance to the destination, the HMI 14 displays the current position of the vehicle and the route to the destination.

The control device 16 is configured by one or more electronic control units (ECUs) each including a CPU, a ROM, a RAM, and the like. The CPU executes operation processing according to a program so that the control device 16 executes various types of vehicle control. The control device 16 may consist of one piece of hardware or may consist of a unit including multiple pieces of hardware. Further, the functions of the control device 16 may be at least partially executed by hardware such as an LSI, an ASIC, and an FPGA or may be executed by a combination of software and hardware.

(Control Device 16)

As shown in FIG. 1, the control device 16 includes an external environment recognizing unit 31, an autonomous driving control unit 32 (Advanced Driver-Assistance System, ADAS), and a map positioning unit (MPU) 33 serving as a map processing unit. These components may be configured by separate electronic control units connected with one another via a gateway (central gateway (CGW)). Alternatively, the components may be configured by an integral electronic control unit.

The external environment recognizing unit 31 recognizes target objects present around the vehicle based on the detection result of the external environment sensor 7, and thereby obtains information related to the position and size of each target object. The target objects recognized by the external environment recognizing unit 31 include delimiting lines drawn on the travel road of the vehicle, lanes, roadsides, shoulders, obstacles, etc.

The delimiting lines are lines drawn along the vehicle travel direction. The lanes are regions delimited by one or more delimiting lines. The roadsides are end portions of the travel road of the vehicle. A shoulder is a region between one roadside and the delimiting line adjacent to the roadside in the vehicle width direction. Obstacles include, for example, protective walls (guardrails), utility poles, surrounding vehicles, pedestrians, and so on.

The external environment recognizing unit 31 analyzes the images captured by the external cameras 18 thereby to recognize the positions of the target objects present around the vehicle relative to the vehicle. For example, the external environment recognizing unit 31 may recognize the distance and direction from the vehicle to each target object as viewed from directly above with respect to the vehicle body, by means of a known method such as triangulation method or a motion stereo method. Further, the external environment recognizing unit 31 analyzes the images captured by the external cameras 18 and determine the kind of each target object (for example, a delimiting line, a lane, a roadside, a shoulder, an obstacle, etc.) based on a known method.

The map positioning unit 33 includes a map acquisition unit 51, a map storage unit 52, an own vehicle position identifying unit 53, a map linkage unit 54, an additional information storage unit 55, a recommended lane setting unit 56, a localization functional unit 57, and a map providing unit 58.

The map acquisition unit 51 accesses the map server 3 and acquires dynamic map data, which is high accuracy map information, from the map server 3. For example, when the navigation device 11 has set a route, the map acquisition unit 51 preferably acquires the latest dynamic map data of the area corresponding to the route from the map server 3 via the communication device 9.

The dynamic map data is more detailed map data than the map data held in the navigation device 11 and includes static information, semi-static information, semi-dynamic information, and dynamic information. The static information includes three-dimensional map data having higher accuracy than the navigation map data. The semi-static information includes traffic restriction information, road construction information, and wide area weather information. The semi-dynamic information includes accident information, traffic jam information, and narrow area weather information. The dynamic information includes traffic light information, surrounding vehicle information, and pedestrian information.

The static information (high accuracy map) of the dynamic map data includes information related to the lanes on the travel road (for example, the number of lanes) and information related to the delimiting lines on the travel road (for example, types of the delimiting lines). For example, each delimiting line of the static information is represented by nodes disposed at distances smaller than those between the nodes of the navigation map data and link connecting the nodes.

Besides, each roadway of the static information also is represented by nodes disposed at a prescribed interval (hereinafter, roadway nodes) and links connecting the nodes (hereinafter, roadway links). Each roadway node is created in the middle between a node of the delimiting line set at the left side end of the road and a node of the delimiting line set at the right side end of the road. The nodes of each roadway link are provided at a prescribed interval along the road.

The map storage unit 52 includes one or more storage devices such as an HDD and an SSD and holds various information necessary for autonomous travel of the vehicle in the autonomous driving mode. The map storage unit 52 stores the dynamic map data that the map acquisition unit 51 has acquired from the map server 3.

The own vehicle position identifying unit 53 identifies the position of the vehicle (latitude and longitude) based on the GNSS signal output from the GNSS receiver 10.

Also, the own vehicle position identifying unit 53 uses the detection result of the vehicle sensor 8 (an inertial measurement unit (IMU) or the like) to calculate the movement amount of the vehicle (movement distance and movement direction of the vehicle) by dead reckoning (for example, odometry). The movement amount of the vehicle calculated by dead reckoning will be referred to as a DR movement amount hereinafter. The own vehicle position identifying unit 53 identifies the own vehicle position based on the DR movement amount when the GNSS signal cannot be received, for example. Also, the own vehicle position identifying unit 53 may execute a process of correcting the own vehicle position identified from the GNSS signal based on the DR movement amount thereby to improve the identification accuracy of the own vehicle position.

The map linkage unit 54 extracts, based on the route output from the navigation device 11, a corresponding route from the high accuracy map held by the map storage unit 52 and outputs the extracted route to the localization functional unit 57.

The additional information storage unit 55 stores pieces of road additional information associated with the links of the dynamic map. Each link of the dynamic map is given an identification number, and the piece of road additional information related to a certain link is identified by the identification number of the link. Each piece of road additional information preferably includes unique information not included in the dynamic map. For example, a piece of road additional information may include information indicating that the related lane is a region in which the reception level of the GNSS signal is lower than a prescribed level. More specifically, a piece of road additional information may preferably indicate that the related link is positioned under an elevated road, the related link is positioned in a tunnel, or the related link is surrounded by high-rise buildings.

The recommended lane setting unit 56 selects, from among the lane links output by the map linkage unit 54, recommended lane links suitable for the travel of the vehicle based on the route, the information held by the dynamic map, etc. For example, when the route extracted by the map linkage unit 54 includes a branch road, the recommended lane setting unit 56 adds, to the recommended lane information of the lane link corresponding to the lane suitable for entrance to the branch road (for example, the lane link of the lane that is 2 km before the entrance to the branch road and is nearest to the branch road), data indicating that the lane is suitable for the travel of the vehicle, and makes the map storage unit 52 store the data.

The localization functional unit 57 acquires a high accuracy map of a relatively narrow region around the vehicle and in the direction of travel of the vehicle based on the own vehicle position identified by the own vehicle position identifying unit 53 and the route extracted by the map linkage unit 54. Thereafter, the localization functional unit 57 identifies the travel lane and the own vehicle position in the travel lane from the positions of the delimiting lines identified by the external environment recognizing unit 31 and the like by using the acquired high accuracy map and the own vehicle position identified by the own vehicle position identifying unit 53. In addition, the localization functional unit 57 creates a local map at all times by adding information on the vehicle surroundings identified by the external environment recognizing unit 31 (for example, information on obstacles) to the acquired high accuracy map.

The localization functional unit 57 may add the road additional information stored in the additional information storage unit 55 to the local map. In this case, the localization functional unit 57 identifies the links whose road additional information is to be added based on the identification numbers. Thereby, the links included in the local map are associated with the corresponding road additional information.

The map providing unit 58 divides the local map data so as to correspond to the regions on the map thereby to create multiple pieces of transmission data, and transmits the multiple pieces of transmission data to the autonomous driving control unit 32 in order.

The autonomous driving control unit 32 includes an action plan unit 41, a travel control unit 42, and a mode setting unit 43.

The action plan unit 41 creates an action plan that defines future action of the vehicle based on the transmission data including the map information received from the map positioning unit 33 and the external environment information received from the external environment recognizing unit 31. The action plan may include events such as follow-up traveling to follow the preceding vehicle, lane change, overtaking, turning to a branch road, etc. In each event, a target trajectory of the vehicle is set. The action plan unit 41 outputs a travel control signal corresponding to the created action plan to the travel control unit 42.

The travel control unit 42 controls the powertrain 4, the brake device 5, and the steering device 6 based on the travel control signal from the action plan unit 41. Namely, the travel control unit 42 makes the vehicle travel following the action plan created by the action plan unit 41.

In the following, description will be made of a method with which the map providing unit 58 creates transmission data from the local map and transmits the transmission data to the autonomous driving control unit 32. The map providing unit 58 executes a map providing process shown in FIG. 2. In the map providing process, the map providing unit 58 first acquires the road traffic information at the own vehicle position based on the own vehicle position and the dynamic map (S1). The dynamic map includes the road traffic information as the dynamic information. The road traffic information includes traffic jam information, construction information, and lane restriction information. In the present embodiment, the map providing unit 58 acquires the traffic jam information in the region corresponding to the own vehicle position. The map providing unit 58 may acquire the road traffic information including the traffic jam information from the local map instead of the dynamic map. Since the local map is created based on the dynamic map, the local map can include the road traffic information included in the dynamic information of the dynamic map.

Figure 2:
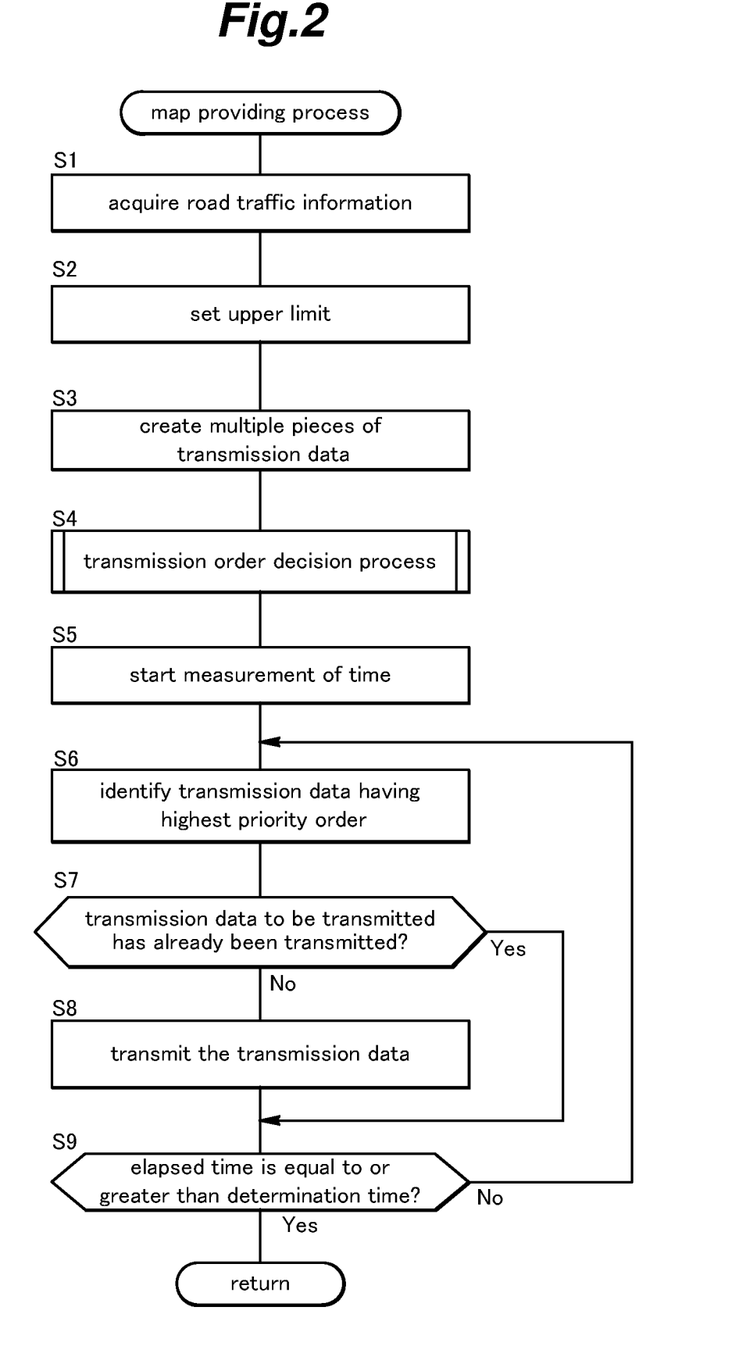
FIG. 2 is a flowchart showing a procedure of a map providing process executed by a map providing unit.

Subsequently, the map providing unit 58 sets an upper limit value of an area of the region on the map corresponding to each piece of transmission data based on the road traffic information (S2). For example, the map providing unit 58 acquires the congestion degree of the road on which the own vehicle is traveling based on the road traffic information, and the higher the congestion degree is, the smaller the map providing unit 58 sets the upper limit value of the area of the region on the map corresponding to each piece of transmission data.

Then, the map providing unit 58 divides the local map data so as to correspond to the regions on the map thereby to create multiple pieces of transmission data (S3). Each piece of transmission data includes multiple nodes and at least one link. The region corresponding to each piece of transmission data includes multiple nodes disposed in the extension direction of the lane and at least one link connecting the multiple nodes. Also, each piece of transmission data may include multiple nodes and multiple links corresponding to multiple lanes that are disposed in parallel. Adjacent regions corresponding to respective pieces of transmission data are connected with each other at the node(s). Multiple nodes are disposed on a boundary of the region corresponding to each piece of transmission data.

The shape of the region corresponding to each piece of transmission data preferably is quadrilateral, such as rectangle or square. In another embodiment, the shape of the region corresponding to each piece of transmission data may be any polygon such as triangle or pentagon depending on the shape formed by the multiple nodes and links.

Preferably, the map providing unit 58 creates each piece of transmission data such that the attributes set for the respective links included in each piece of transmission data are identical. The map providing unit 58 sets the pieces of transmission data such that the area of the region on the map corresponding to each piece of transmission data is smaller than or equal to the upper limit value set in step S2. Namely, the map providing unit 58 changes the area of the region on the map corresponding to each piece of transmission data based on the road traffic information. Also, the map providing unit 58 preferably creates the pieces of transmission data by dividing the region positioned within a prescribed distance from the position of the own vehicle. By including the links having the same attribute in a single piece of transmission data, it is possible to compress the data amount.

Also, the map providing unit 58 preferably creates each piece of transmission data such that the road additional information associated with each link is identical. Namely, it is preferable that the links having different road additional information are included in different pieces of transmission data. By including links having the identical road additional information in a single piece of transmission data, it is possible to compress the data amount.

Then, the map providing unit 58 executes a transmission order decision process to decide the order of transmission of the created multiple pieces of transmission data to the autonomous driving control unit 32 (S4). The transmission order decision process is executed according to the procedure shown by the flowchart of FIG. 3.

Figure 3:
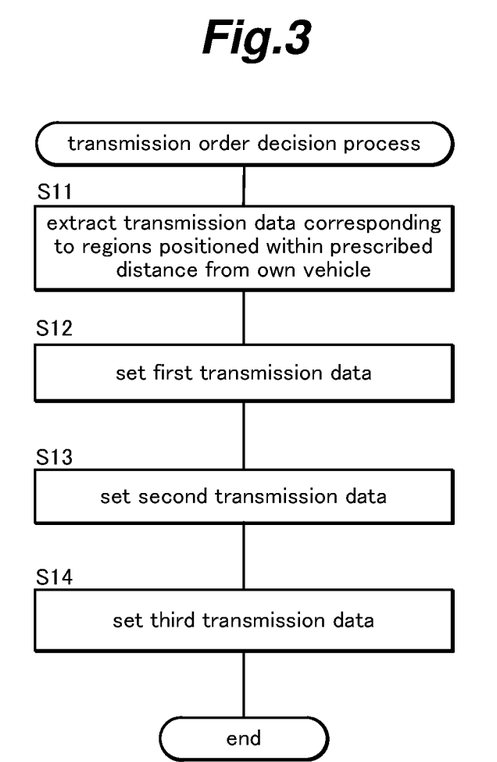
FIG. 3 is a flowchart showing a procedure of a transmission order decision process executed by the map providing unit.
Figure 4:
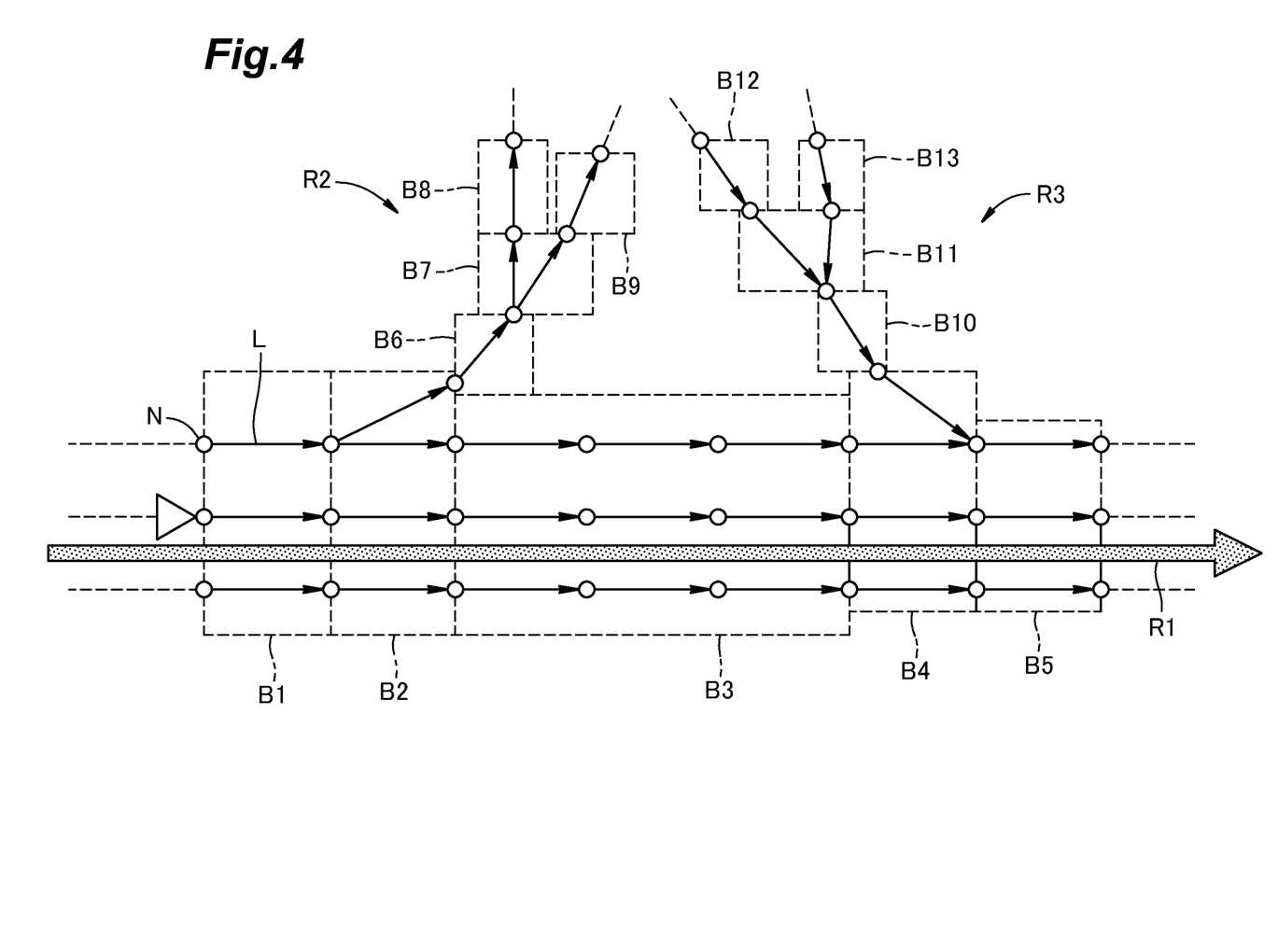
FIG. 4 is an explanatory diagram showing an example of a transmission order of pieces of transmission data.

In the transmission order decision process, the map providing unit 58 first extracts the pieces of transmission data corresponding to the regions positioned within a prescribed distance from the own vehicle (S11). FIG. 4 is an explanatory diagram showing pieces of transmission data set based on the route and priority orders of the pieces of transmission data. In FIG. 4, the route includes a route R1 to the destination, a branch route R2 that branches off from the route R1 to the destination, and a merging route R3 that merges with the route R1 to the destination. The route R1 to the destination, the branch route R2, and the merging route R3 have multiple nodes N representing points on the lanes and links L each connecting two nodes N adjacent to each other in an extension direction of a lane. The direction of an arrow of each link L represents the direction of travel of the vehicle. The vehicle can enter the branch route R2 from the route R1 to the destination, but the vehicle cannot enter the merging route R3 from the route R1 to the destination. For example, in a case where the route R1 to the destination is a highway, the branch route includes an exit ramp of the highway, and the merging route includes an entrance ramp of the highway. The position of the vehicle is represented by a white triangle. The route R1 to the destination includes three parallel lanes.

The transmission data for the route R1 to the destination is divided so as to correspond to blocks B1 to B5 on the map, the transmission data for the branch route R2 is divided so as to correspond to blocks B6 to B9, and the transmission data for the merging route R3 is divided so as to correspond to blocks B10 to B13. With the process of step S11, the map providing unit 58 extracts the pieces of transmission data corresponding to the blocks B1 to B13, namely, the pieces of transmission data corresponding to the regions positioned within a prescribed distance from the own vehicle.

Subsequently, the map providing unit 58 extracts, from the multiple pieces of transmission data extracted in step S11, multiple pieces of transmission data corresponding to the regions including the route to the destination, and sets them as first transmission data (S12). In the example of FIG. 4, the pieces of transmission data corresponding to the blocks B1 to B5 are set as the first transmission data. The multiple pieces of transmission data included in the first transmission data are given priority orders such that a piece of transmission data corresponding to a region nearer to the position of the own vehicle is given a higher priority order. Thus, the priority orders are set for the multiple pieces of transmission data included in the first transmission data corresponding to the blocks B1 to B5 such that the priority orders are high in the order of B1 to B5.

Then, the map providing unit 58 extracts, from the multiple pieces of transmission data extracted in step S11, multiple pieces of transmission data corresponding to regions including the branch route, and sets them as second transmission data (S13). In the example of FIG. 4, the pieces of transmission data corresponding to the blocks B6 to B9 are set as the second transmission data. The multiple pieces of transmission data included in the second transmission data are given priority orders such that a piece of transmission data corresponding to a region nearer to the branch point from the route to the destination is given a higher priority order. Thus, the priority orders are set for the multiple pieces of transmission data included in the second transmission data corresponding to the blocks B6 to B9 such that the priority orders are high in the order of B6 to B9.

Further, the map providing unit 58 extracts, from the multiple pieces of transmission data extracted in step S11, multiple pieces of transmission data corresponding to the regions including the merging route, and sets them as third transmission data (S14). In the example of FIG. 4, the pieces of transmission data corresponding to the blocks B10 to B13 are set as the third transmission data. The multiple pieces of transmission data included in the third transmission data are given priority orders such that a piece of transmission data corresponding to a region nearer to the merge point with the route to the destination is given a higher priority order. Thus, the priority orders are set for the multiple pieces of transmission data included in the third transmission data corresponding to the blocks B10 to B13 such that the priority orders are high in the order of B10 to B13.

After executing the transmission order decision process, the map providing unit 58 starts measurement of time (S5). In another embodiment, the map providing unit 58 may start measurement of travel distance instead of starting measurement of time.

Subsequently, the map providing unit 58 identifies a single piece of transmission data having the highest priority order from the pieces of transmission data (S6). The transmission order is determined based on the priority orders which are high in the order of the first transmission data, the second transmission data, the third transmission data, and the other data. As described above, the multiple pieces of transmission data included in the first transmission data are given priority orders such that a piece of transmission data corresponding to a region nearer to the position of the own vehicle is given a higher priority order. The multiple pieces of transmission data included in the second transmission data are given priority orders such that a piece of transmission data corresponding to a region nearer to the branch point from the route to the destination is given a higher priority order. The multiple pieces of transmission data included in the third transmission data are given priority orders such that a piece of transmission data corresponding to a region nearer to the merge point with the route to the destination is given a higher priority order. For the pieces of transmission data classified in the other transmission data, it is preferable if a piece of transmission data corresponding to a region nearer to the position of the own vehicle is given a higher priority order. Thus, in the example of FIG. 4, the pieces of transmission data are given priority orders such that the priority orders are high in the order of block B1 to the block B13.

Then, the map providing unit 58 determines whether the piece of transmission data with the highest priority order identified in step S6 matches the transmission data already transmitted to the autonomous driving control unit 32 (S7). If the entirety of the piece of transmission data with the highest priority order identified in step S6 is included in the transmission data already transmitted to the autonomous driving control unit 32, the map providing unit 58 determines that the piece of transmission data with the highest priority order identified in step S6 matches the transmission data already transmitted to the autonomous driving control unit 32. If at least part of the piece of transmission data with the highest priority order identified in step S6 is not included in the transmission data already transmitted to the autonomous driving control unit 32, the map providing unit 58 determines that the piece of transmission data with the highest priority order identified in step S6 does not match the transmission data already transmitted to the autonomous driving control unit 32. Thereby, transmission of overlapping transmission data to the autonomous driving control unit 32 is prevented.

If the determination result in step S7 is No, the map providing unit 58 transmits the piece of transmission data with the highest priority order identified in step S6 to the autonomous driving control unit 32 (S8).

Thereafter, the map providing unit 58 determines whether the elapsed time which is started to be measured in step S5 has become equal to or greater than a prescribed determination time (S9). If the elapsed time is less than the determination time (the determination result of S9 is No), the map providing unit 58 returns to step S6 and identifies the piece of transmission data with the next highest priority order. When the elapsed time is equal to or greater than the determination time (the determination result of S9 is Yes), the map providing unit 58 repeats the process from step S1. Thereby, the map providing unit 58 can transmit appropriate transmission data to the autonomous driving control unit 32 according to the travel of the vehicle.

With the map providing process, the map providing unit 58 transmits the first transmission data to the autonomous driving control unit 32 preferentially over the other transmission data. Also, the map providing unit 58 transmits the second transmission data to the autonomous driving control unit 32 preferentially over the other transmission data excluding the first transmission data. Further, the map providing unit 58 transmits the third transmission data to the autonomous driving control unit 32 preferentially over the other transmission data excluding the first transmission data and the second transmission data.

According to this aspect, in the vehicle system 1, it is possible to select regions in which the vehicle will be likely to travel and to output the corresponding map information to the autonomous driving control unit 32. Since the map providing unit 58 creates the transmission data for the regions including the route R1 to the destination and transmits it to the autonomous driving control unit 32 preferentially over the transmission data for the other regions, the autonomous driving control unit 32 can preferentially acquire the map information necessary for autonomous driving. Also, since the map providing unit 58 creates the transmission data for the regions including the branch route R2 and transmits it to the autonomous driving control unit 32 preferentially next to the transmission data for the regions including the route R1 to the destination, the autonomous driving control unit 32 can continue autonomous driving even when the route to the destination R1 is changed. Further, by recognizing the merging route R3, the autonomous driving control unit 32 can recognize and infer the behavior of the vehicles traveling on the merging route R3.

In step S3, the map providing unit 58 may create pieces of transmission data such that the data amount of each piece of transmission data is within a prescribed range. Namely, the map providing unit 58 may make the data amount of each piece of transmission data uniform. According to this aspect, since the data amount of each piece of transmission data is made uniform, the map providing unit 58 and the autonomous driving control unit 32 can efficiently process the pieces of transmission data.

Figure 5A:
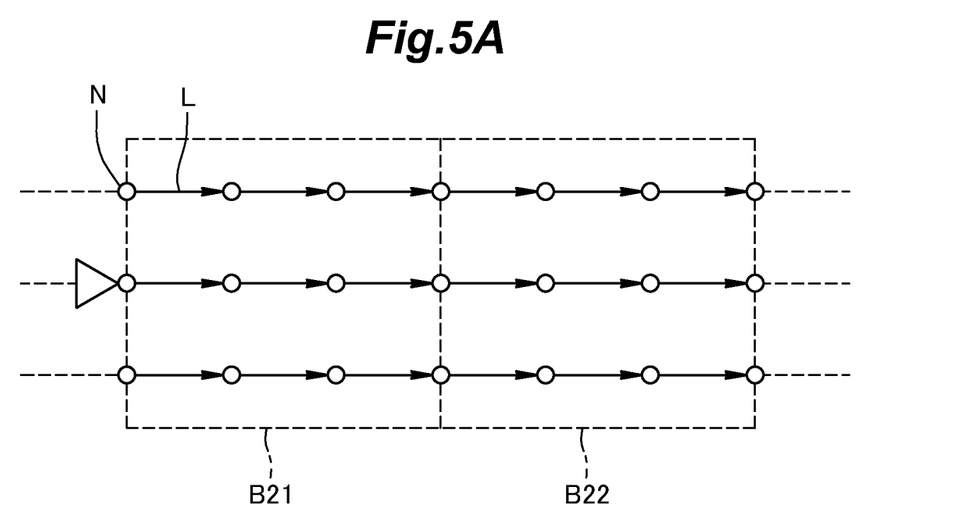
FIG. 5A is an explanatory diagram showing regions corresponding to pieces of transmission data in a case where the congestion degree is high.
Figure 5B:
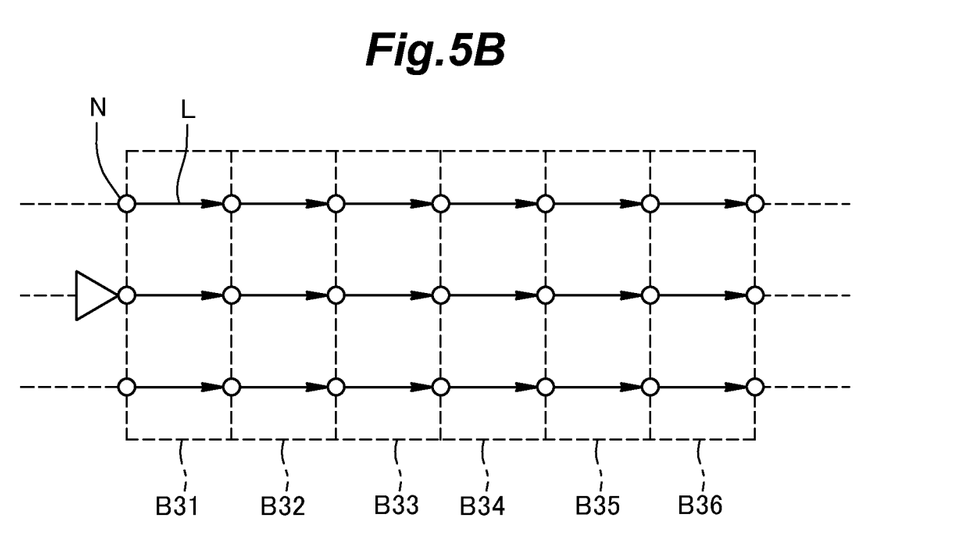
FIG. 5B is an explanatory diagram showing regions corresponding to pieces of transmission data in a case where the congestion degree is low.

According to the map providing process executed by the above-described map providing unit, the data amount of each piece of transmission data is changed based on the degree of vehicle congestion or the degree of traffic jam included in the road traffic information. For example, when the congestion degree is low, blocks B21, B22 (regions) on the map each corresponding to a single piece of transmission data are set to be relatively long in the lane extension direction (see FIG. 5A). On the other hand, when the congestion degree is high, blocks B31 to B36 on the map each corresponding to a single piece of transmission data are set to be shorter in the lane extension direction than when the congestion degree is low (see FIG. 5B). Thereby, when the degree of vehicle congestion is high, the data amount of each piece of transmission data is set smaller than when the degree of vehicle congestion is low. If an area of the block represented by a single piece of transmission data becomes large, compression of the data amount becomes possible. Also, since the number of pieces of transmission data to which it is necessary to give priority orders in transmission decreases, the calculation load is reduced. When an area of the block represented by a single piece of transmission data becomes small, it becomes possible to finely set the priority orders in transmission.

Figure 6:
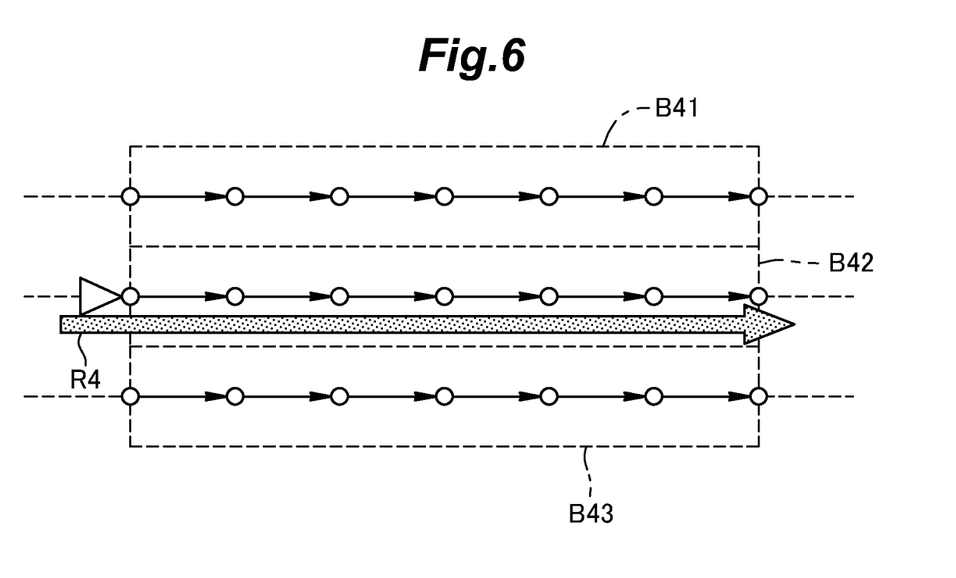
FIG. 6 is an explanatory diagram showing a case where pieces of transmission data are created for respective lanes.

In step S3, the map providing unit 58 may create transmission data divided for each lane. And, the map providing unit 58 may transmit pieces of transmission data corresponding to only some of the multiple parallel lanes to the autonomous driving control unit 32. FIG. 6 shows an example in which blocks B41 to B43 are set so as to correspond to the respective lanes. According to this, it is possible to reduce the data amount of each piece of transmission data transmitted from the map providing unit 58 to the autonomous driving control unit 32.

Preferably, the map providing unit 58 creates transmission data divided for each lane and transmits a piece of transmission data corresponding to the recommended lane set by the recommended lane setting unit 56 to the autonomous driving control unit 32. In this case, preferably, the map providing unit 58 transmits only the piece of transmission data corresponding to the recommended lane R4 of the multiple parallel lanes to the autonomous driving control unit 32.

The map providing unit 58 may change the shape and size of the region on the map corresponding to each piece of transmission data based on selection information that decides a travel mode of the vehicle. For example, the selection information may indicate a frequency of overtaking in the autonomous driving control, which is preferably selected from "frequent overtaking" and "infrequent overtaking." Preferably, the selection information can be set by the user. The selection information is preferably input from the touch panel 23 by an operation of the user, for example. The input selection information is preferably stored in the storage device of the control device 16.

Figure 7:
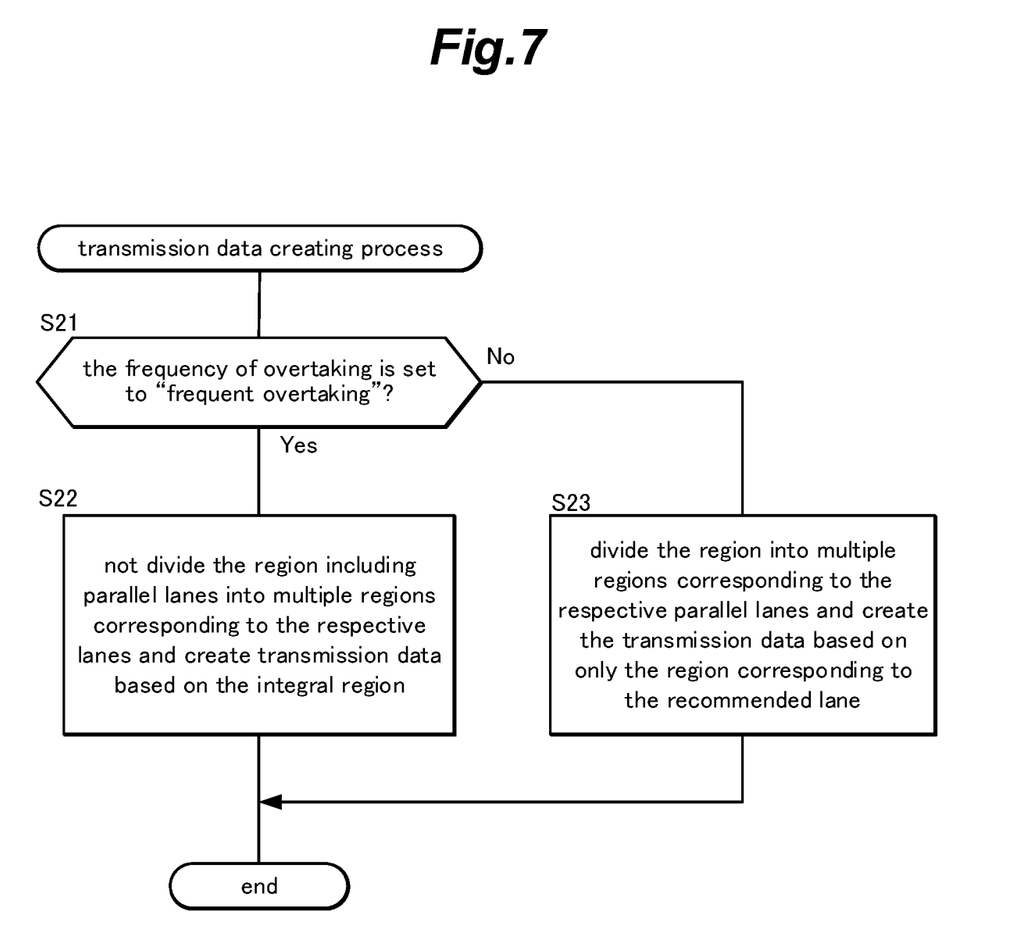
FIG. 7 is a flowchart showing the procedure of a transmission data creating process executed by the map providing unit.

As shown in FIG. 7, in the case where the selection information is set to "frequent overtaking (S21: Yes)," it is preferable if the map providing unit 58 does not divide a region including the parallel lanes into multiple regions corresponding to the respective lanes and creates transmission data based on the integral (undivided) region S22). On the other hand, in the case where the selection information is set to "infrequent overtaking (S21: No)," it is preferable if the map providing unit 58 divides the region into multiple regions corresponding to the respective parallel lanes and creates the transmission data based on only the region corresponding to the recommended lane S23).

Preferably, the map providing unit 58 creates transmission data divided for each lane in step S3 of the map providing process and sets the priority order of the region corresponding to the recommended lane to be higher than that of the first transmission data in the transmission order decision process of step S4. Thereby, the autonomous driving control unit 32 can acquire the map information of the region corresponding to the recommended lane.

Concrete embodiments of the present invention have been described in the foregoing, but the present invention is not limited to the above embodiments and may be modified or altered in various ways.

The invention claimed is:

1. A vehicle system comprising:
   a map processing unit that creates local map data based on high accuracy map data and a position of an own vehicle by extracting data of regions near the own vehicle from the high accuracy map data;
   and an autonomous driving control unit that receives the local map data from the map processing unit, creates a travel plan for autonomous traveling of the own vehicle based on the local map data, and controls traveling of the own vehicle according to the travel plan, and
   a map guidance unit that, based on a set destination, sets a route to the destination,
   wherein the map processing unit creates multiple pieces of transmission data by dividing the local map data so as to correspond to regions on a map and transmits the multiple pieces of transmission data to the autonomous driving control unit,
   the map processing unit changes a shape and a size of one of the regions on the map corresponding to each piece of transmission data based on a frequency of overtaking in the autonomous driving control,
   the map processing unit decides a recommended lane on which the own vehicle should travel based on the route to the destination,
   in the case where the frequency of overtaking is set to "frequent overtaking," the map processing unit does not divide one of the regions on the map including parallel lanes into multiple regions corresponding to the respective lanes and creates transmission data based on the one of the regions on the map, and
   in the case where the frequency of overtaking is set to "infrequent overtaking," the map processing unit divides one of the regions on the map into multiple regions corresponding to the respective parallel lanes and creates the transmission data based on only one of the multiple regions corresponding to the recommended lane.

2. The vehicle system according to claim 1, wherein the frequency of overtaking can be set by a user.

3. The vehicle system according to claim 1, wherein in the high accuracy map data, a lane is represented by multiple nodes and links connecting the nodes, the links being provided with identification numbers, and
   the map processing unit stores road additional information corresponding to the identification numbers, divides a link containing specific road additional information from the other links, and creates transmission data by adding the road additional information.

4. The vehicle system according to claim 3, wherein the road additional information includes information indicating that the lane is a region in which a reception level of a GNSS signal is lower than a prescribed level.

* * * * *